Nov. 16, 1948.  H. B. BERCAW  2,453,963
PULLEY BLOCK
Filed July 27, 1945  3 Sheets-Sheet 1

Inventor
Henry Bruce Bercaw.

By Clarence A. O'Brien
and Harvey B. Jacobson
Attorneys

Nov. 16, 1948.　　　H. B. BERCAW　　　2,453,963
PULLEY BLOCK
Filed July 27, 1945　　　3 Sheets-Sheet 2
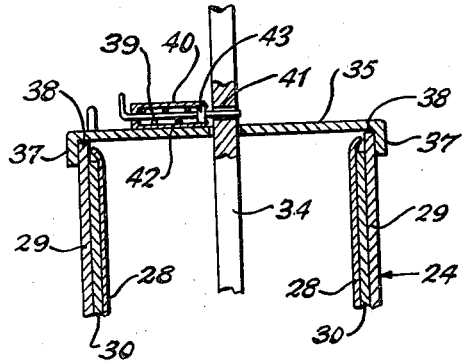
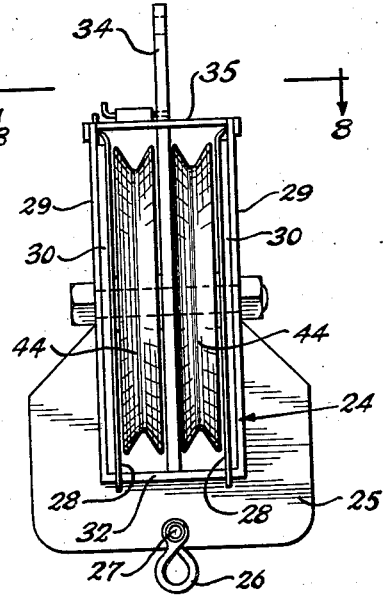
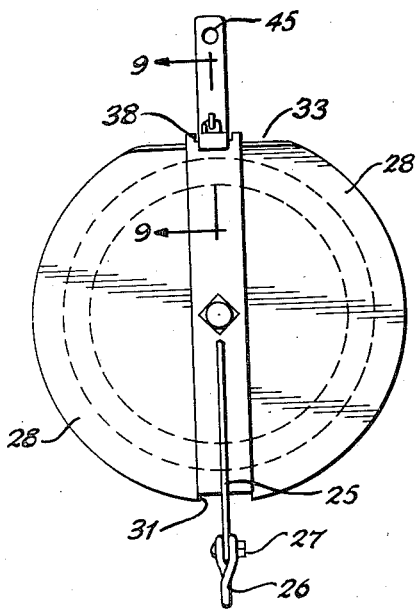
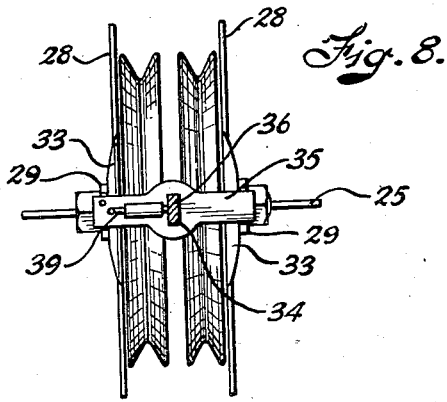
Inventor
Henry Bruce Bercaw.
By Clarence A. O'Brien
and Harvey B. Jacobson
Attorneys Nov. 16, 1948.   H. B. BERCAW   2,453,963
PULLEY BLOCK Filed July 27, 1945   3 Sheets-Sheet 3

Inventor

Henry Bruce Bercaw.

By Clarence A. O'Brien
and Harvey B. Jacobson
Attorneys

Patented Nov. 16, 1948

2,453,963

UNITED STATES PATENT OFFICE 2,453,963

PULLEY BLOCK

Henry Bruce Bercaw, Kenton, Ohio

Application July 27, 1945, Serial No. 607,303

1 Claim. (Cl. 254—193)

My invention relates to improvements in pulley blocks for use more particularly as so-called "snatch blocks" in hoisting rigs, and the like, the primary object in view being to provide a simply constructed pulley block designed for easy quick reeving of cable, or rope, therethrough, and which is safe, especially adapted for heavy duty and for use as a ground block, and is comparatively inexpensive to manufacture.

Other and subordinate objects, also comprehended by my invention, together with the precise nature of my improvements, and the advantages thereof, will be readily understood when the succeeding description and claim are read with reference to the drawings accompanying and forming part of this specification.

Figure 1:
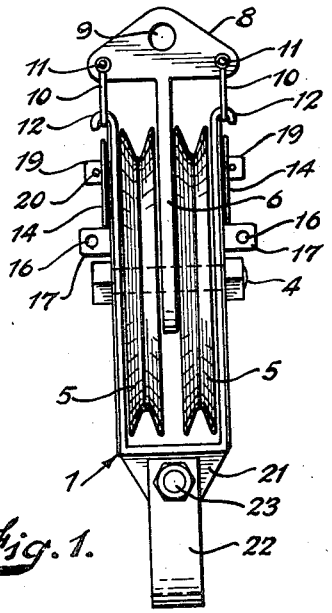
Figure 2:
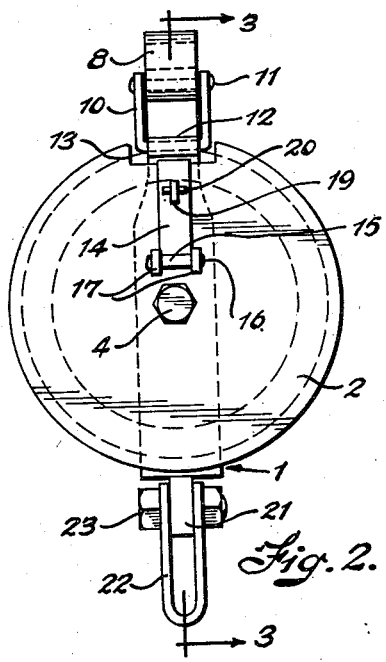
Figure 3:
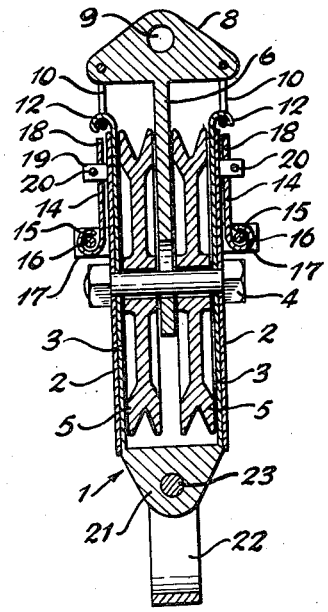
Figure 5:
Figure 4:
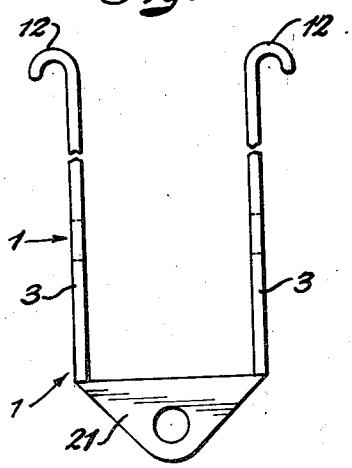
Figure 10:
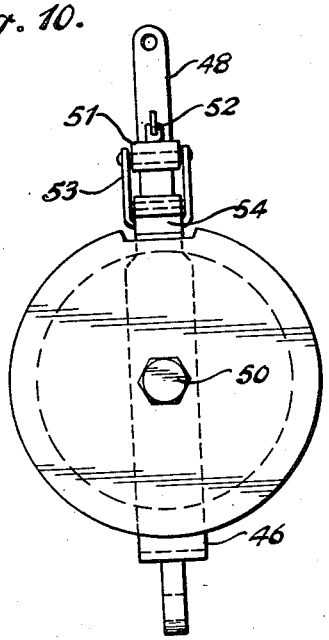
Figure 11:
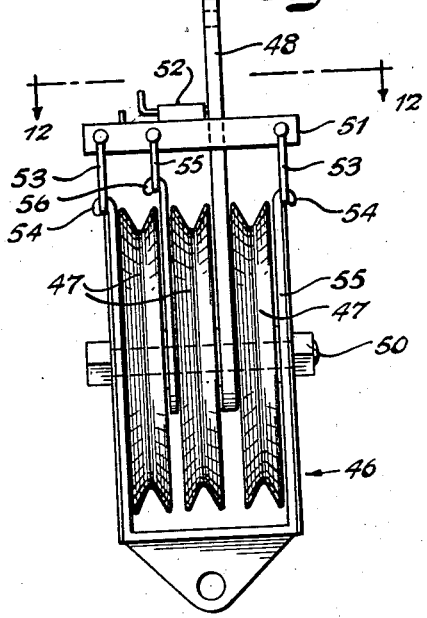
Figure 12:
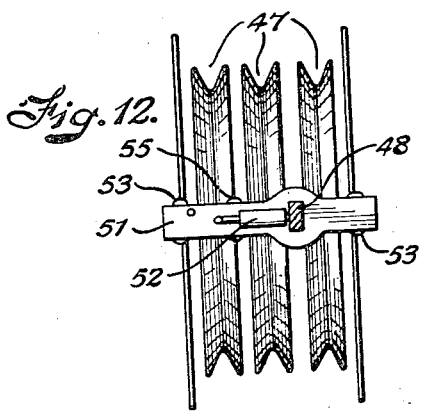
Figure 14:
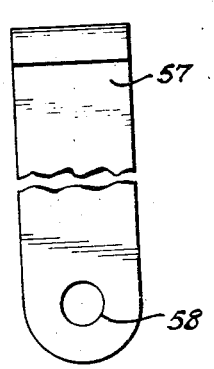
Figure 13:
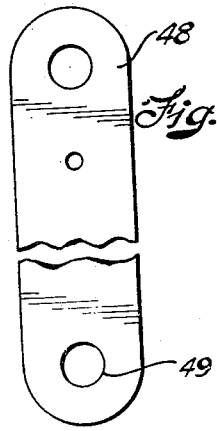

In said drawings:

Figure 1 is a view in edge elevation of my improved pulley block in a preferred embodiment thereof, Figure 2 is a view in side elevation, Figure 3 is a view in longitudinal section taken on the line 3—3 of Figure 2, Figure 4 is a view in edge elevation of the yoke drawn to an enlarged scale, Figure 5 is a view in side elevation of the drawbar, Figure 6 is a view in edge elevation of a modified embodiment of my improved pulley block, Figure 7 is a view in side elevation of the same, Figure 8 is a view in transverse section taken on the line 8—8 of Figure 6, Figure 9 is a fragmentary view in longitudinal section taken on the line 9—9 of Figure 7, Figure 10 is a view in side elevation of another modified embodiment of my improved pulley block, Figure 11 is a view in edge elevation of the same, Figure 12 is a view in transverse section taken on the line 12—12 of Figure 11, Figure 13 is a view in side elevation of the drawbar of the second modified embodiment, and Figure 14 is a similar view of the spacer bar of the second modified embodiment.

Referring now to the drawings by numerals, and first to Figures 1 to 5, according to the preferred embodiment of my invention, a pulley block is provided comprising, as its basic element, a U-shaped yoke 1 of suitable bar metal.

A pair of metal guard discs 2 are opposed to opposite sides 3 of the yoke 1, with said sides extending diametrically of said guard discs. The guard discs 2 are of substantially the same diameter as the length of the sides 3 of said yoke 1 and are suitably secured to said sides, as by spot-welding, not shown.

The usual spindle bolt 4 extends through the sides 3 of the yoke 1, substantially midway thereof, and through the guard discs 2 in the axis of said discs.

A pair of the usual sheaves 5 are rotatably mounted on the spindle bolt 4 in the yoke 1 side by side and are spaced apart laterally for a purpose presently seen. The sheaves 5 are sufficiently smaller in diameter than the guard discs 2 to be enclosed between the same.

A drawbar 6, of suitable heavy gauge metal, is interposed between the pair of sheaves 5 with a longitudinal inner end slot 7 therein through which the spindle bolt 4 extends and by means of which the drawbar 6 normally picks up the spindle bolt 4 and hence the yoke 1. The drawbar 6 extends out of the open end of the yoke 1 a short distance and is equipped with a T-head 8 extending endwise across the open end of the yoke 1, and which is preferably triangular in longitudinal section for reinforcement purposes, and slightly longer than the width of the yoke 1 for a purpose presently apparent. A transverse aperture 9 is provided in the apex portion of the T-head 8 in the plane of the drawbar 6 for attachment of the terminal of a tackle cable, not shown, to said drawbar.

A pair of U-type shackles 10 connect the ends of the T-head 8 of the drawbar 6 to the sides 3 of the yoke 1, said shackles 10 straddling said T-head and being connected thereto by pivot pins 11, and the sides 3 of the yoke 1 terminating at the open end of said yoke in outwardly turned hooks 12, substantially semi-cylindrical, and with which the shackles 10 are detachably engaged. As best shown in Figure 2, the hooks 12 extend out of square edge notches 13 in the guard discs 2 so that the same are accessible for fastening and unfastening the shackles 10. The hooks 12 are thus extended for another purpose presently apparent.

A pair of shackle latches 14 are provided on the guard discs 2 and which are of strap metal with inner ends rolled to form hinge barrels 15 by means of which and pivot pins 16 said latches are mounted between pairs of laterally extending lugs 17 on the guard discs 2 to extend radially between the spindle bolt 4 and the hooks 12 for swinging toward said guard discs 2 to position the outer ends of the latches opposite the open sides of the hooks 12, whereby the shackles 10 are prevented from escaping from said hooks 12. The latches 14 are each provided with an outer end aperture 18 therein, and a pair of lateral studs 19 are provided on the guard discs 2 for extension through said apertures 18 with keeper pins 20 driven through the same to maintain the latches 14 in latching position.

A dead end hitch is provided on the closed end of the yoke 1 in the form of a lug 21 on said end and a clevis 22 bolted to the lug 21, as at 23.

As will be readily apparent, by driving out the pins 20, and swinging the shackle latches 14 outwardly into unlatching position, the shackles 10 may be disengaged, or unfastened, from the hooks 12 and then swung outwardly to open up the described block upon opposite sides of the drawbar 6, so that cable, not shown, may be reeved around the sheaves 5, after which the shackles 10 may be re-engaged with the hooks 12 to close the block. The slot 7 in the drawbar 6 provides for retraction of said bar inwardly of the yoke 1 so that the shackles 10 may be disengaged from the hooks 12. Thus, time and labor may be saved in reeving a cable through the block and around the sheaves 5. By means of the dead end hitch comprising the clevis 22, the invention may be used as a ground block. As will be clear, the yoke 1 and sheaves 5 are suspended by the drawbar 6 and the shackles 10 from a cable attached to the T-head 8 of the drawbar 6, the major portion of the load being on the drawbar.

In the modified embodiment of the invention shown in Figures 6 to 9, the yoke 24 is provided with a reinforcing fin 25 around the closed end of said yoke to which a dead end hitch link 26 is pivoted, as at 27. The guard discs 28 are arranged between the sides 29 of the yoke 24 with diametrical metal spacing strips 30 interposed between the same and the sides 29 and fixed thereto and to said sides by spot-welding, not shown. Also, the guard discs 28 are notched, as at 31, to straddle the closed end 32 of the yoke 24 and are provided with relatively flared flattened edge portions 33 at the open end of the yoke 24 to prevent cable cutting. The drawbar 34 is integral at its inner end with the closed end 33 of the yoke 24.

A cross-bar 35 centrally apertured, as at 36, for sliding on the drawbar 34 closes the open end of the yoke 24. The cross-bar 35 is provided with right angled ends 37 straddling the terminals of the sides 29 of the yoke 24 to brace said drawbar 34 and said yoke 24 laterally, and said cross-bar is adapted to seat in terminal notches 38 in said sides 29 to oppose twisting of the drawbar 34 and the yoke 24 relatively.

A latch secures the cross-bar 35 to the drawbar 34 in the described position and which comprises a draw pin 39 endwise slidable in a barrel 40 on the cross-bar 35 with one end extending into an aperture 41 in the drawbar 34. A coil spring 42 in the barrel 40 opposed to a collar 43 on said draw pin 39 maintains said draw pin in said aperture 41. A stop lug 44 on the cross-bar 35 limits retraction of the draw pin 39 when the same is retracted out of the aperture 41. In this embodiment of my invention, dual sheaves 44' are provided also in the described block. The drawbar 34 is provided with a suitable aperture 45 in the outer end thereof for connection of the terminal of the cable, not shown, thereto.

As will be seen, by unlatching the cross-bar 35, in a manner which will be understood, from the drawbar 34 and sliding said cross-bar 35 on the drawbar 34 away from the yoke 24, said yoke may be opened for reeving a cable around the sheaves 44, after which the cross-bar 35 may be slid back and latched to said drawbar 34 to close said yoke. The spacing strips 30 strongly reinforce the described yoke and the described edge portions 33 on the guard discs 28 provide for said discs clearing the cross-bar 35 when the latter is locked. As will be apparent, in this embodiment of my invention, the entire load is sustained primarily by the drawbar 34.

In the second modified embodiment of my invention shown in Figures 10 to 14, the yoke 46 of the block is substantially the same as that described with reference to the preferred embodiment of the invention, but is designed to accommodate therein three sheaves 47 spaced apart laterally.

The drawbar 48 is of the same type as that described with reference to the first modified embodiment of the invention, but is provided with an inner end aperture 49 through which the spindle bolt 50 extends and whereby said drawbar is attached to said spindle bolt.

The open end of the yoke 46 is closed by a cross-bar 51 slidable on the drawbar 48 in the same manner as the cross-bar 35 and adapted to be latched thereto by a latch 52 in the same manner as described with reference to the first modified embodiment of the invention.

A pair of shackles 53, similar to shackles 10, connect the ends of the cross-bar 51 to terminal hooks 54 on the sides 55 of the yoke 46. A third shackle 55 connects the cross-bar 51 to a hook 56, similar to hooks 54, on the outer end of a spacer bar 57 having an aperture 58 in its inner end through which the spindle bolt 50 is extended, the spacing bar 57 being interposed between the center and one of the outer sheaves 47, whereas, the drawbar 48 is interposed between said center sheave and the other outer sheave 47.

In the second modified embodiment of the invention described, the open end of the yoke 46 is opened up by unlatching the cross-bar 51, sliding said cross-bar toward the yoke 46, and then disengaging the shackles 53 from the hooks 54 and the shackle 55 from the hook 56. When said shackles are thus disengaged, cable or rope may be reeved around the sheaves 47 easily and quickly, after which the shackles may be re-engaged and the cross-bars slid outwardly on the drawbar 48 and latched thereto in a manner which will be apparent.

In all of the described embodiments of my invention, it will be seen that cable or rope may be reeved through the block over the sheaves without the operator being required to pull the entire length of the cable or rope through the block.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a device of the class described, a yoke having sides and an open end, a spindle bolt extending cross-wise through said sides, sheaves rotatably mounted on said spindle bolt, a drawbar for suspending said device interposed between said sheaves and extending out of the open end of said yoke with said spindle bolt extending therethrough, and means to open and close said open end of the yoke upon opposite sides of said drawbar comprising a crosshead on said drawbar, terminal hooks on the sides of said yoke, shackles on the ends of the cross-bar detachably attached to said hooks, said cross-bar being slidable on said drawbar toward said yoke to provide for detaching the shackles from the hooks, and coacting latch devices on the cross-bar and drawbar, respectively, for preventing such sliding of the cross-bar.

HENRY BRUCE BERCAW.

REFERENCES CITED

The following references are of record in the file of this patent:

UNITED STATES PATENTS

| Number | Name | Date |
| --- | --- | --- |
| 387,071 | Hartz | July 31, 1888 |
| 689,090 | Johnson | Dec. 17, 1901 |
| 835,877 | Bass | Nov. 13, 1906 |
| 901,144 | Bass | Oct. 13, 1908 |